INVENTOR
JOHN V. BARNES
BY John R. Faulkner
Clifford L. Sadler
ATTORNEYS

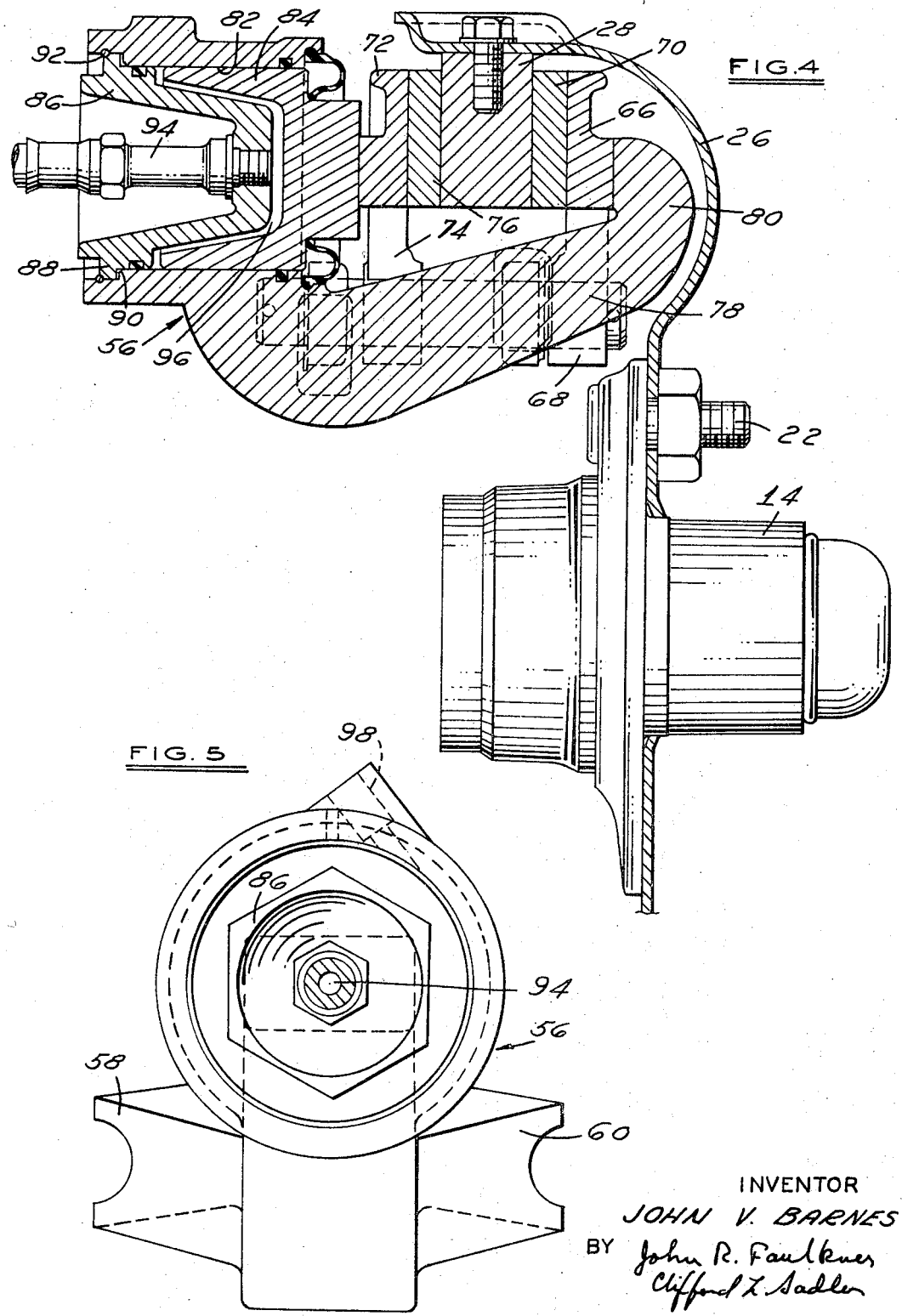

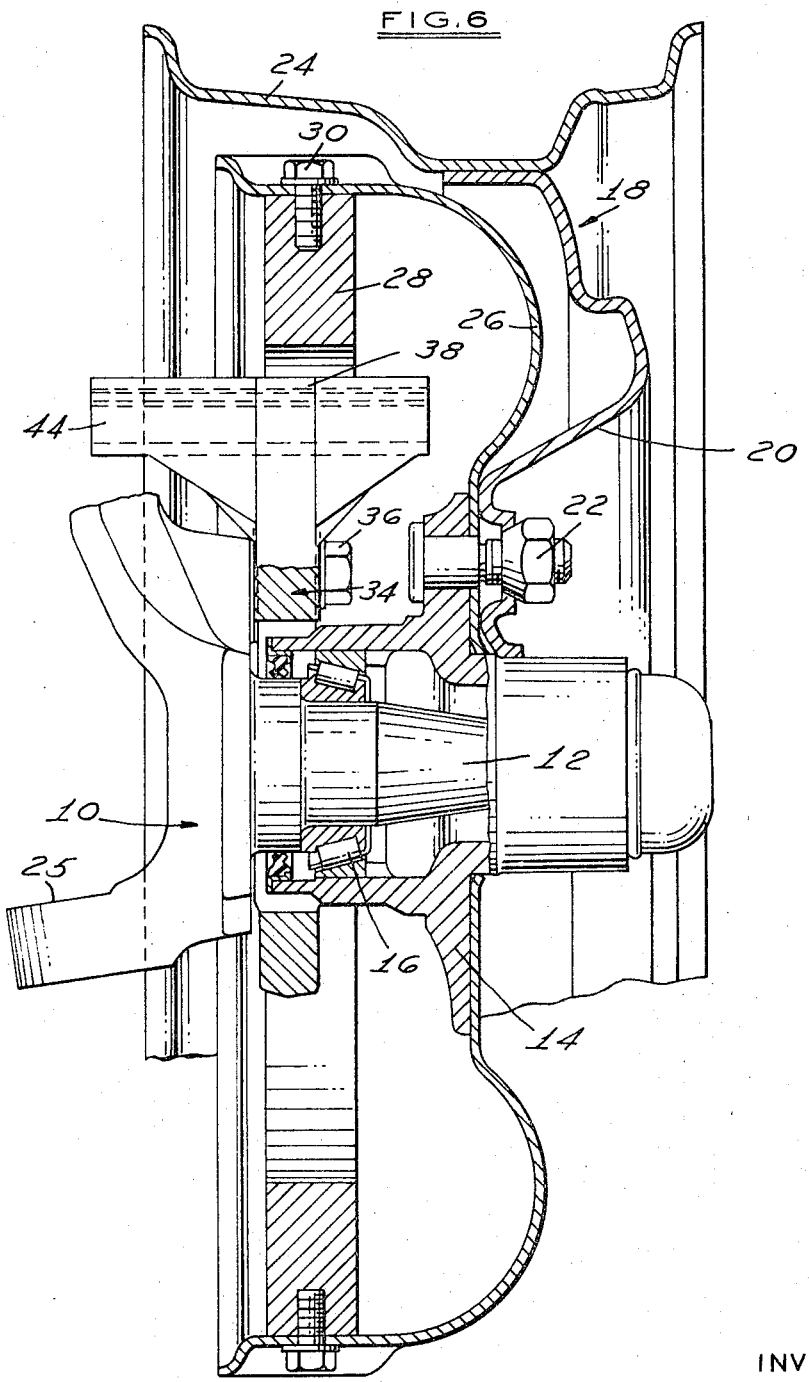

United States Patent Office 3,424,277
Patented Jan. 28, 1969

3,424,277
INSIDE CALIPER DISC BRAKE
John V. Barnes, Detroit, Mich., assignor to Ford Motor Company, Dearborn, Mich., a corporation of Delaware
Filed May 3, 1967, Ser. No. 635,916
U.S. Cl. 188—73      13 Claims
Int. Cl. F16d 55/224

ABSTRACT OF THE DISCLOSURE

A disc brake for a motor vehicle having an annular brake rotor supported at its outer periphery. A floating brake caliper straddles the inner edge of the rotor and is supported on removable pins.

Background of the invention

It is present practice in automotive design to provide a disc brake having a circular brake rotor attached to the wheel. The brake caliper is fitted within the sweep of the wheel rim and straddles the outer edge of the rotor. With this design, the diameter of the brake rotor is severely limited in order to permit positioning of the caliper within the wheel.

These prior disc brake designs restricts the size of the brake lining. Such a construction also limits air circulation about the brake caliper with the result that there is heating of the brake and possible boiling of the hydraulic fluid.

In view of the state of the art, it is an object of the present invention to provide an improved disc brake for a motor vehicle in which the brake rotor is of the largest possible diameter and the brake caliper is positioned for superior air circulation.

Brief summary of the invention

In accordance with the preferred embodiment of the present invention, an annular brake rotor is supported at its outer periphery by a cup-shape member that is secured to the wheel. A floating brake caliper straddles the inner edge of the rotor and engages opposed brake linings that are constructed to clamp the rotor when pressure fluid is directed to the single pressure chamber of the caliper. The caliper and brake linings are supported in a sliding fashion on a pair of removable tubes or retaining pins which, in turn, are carried by a torque reaction member bolted to a wheel support structure.

This arrangement has the advantage of providing a brake rotor having the largest possible diameter for a given wheel size. As a consequence, the brake lining area may also be of a maximum size. The brake is easily packaged within the wheel and the hydraulic portion of the brake is exposed to the air stream to avoid heating problems.

Brief description of the drawings

The many objects and advantages of this new disc brake will become apparent from the following description and the accompanying drawings, in which:

FIGURE 4 is a sectional view of the brake caliper and rotor;

FIGURE 5 is an end view of brake caliper; and

FIGURE 6 is an elevational view partly in section of a wheel with the brake rotor and torque reaction member. The caliper assembly has been removed.

Detailed description of the invention

Figure 1:
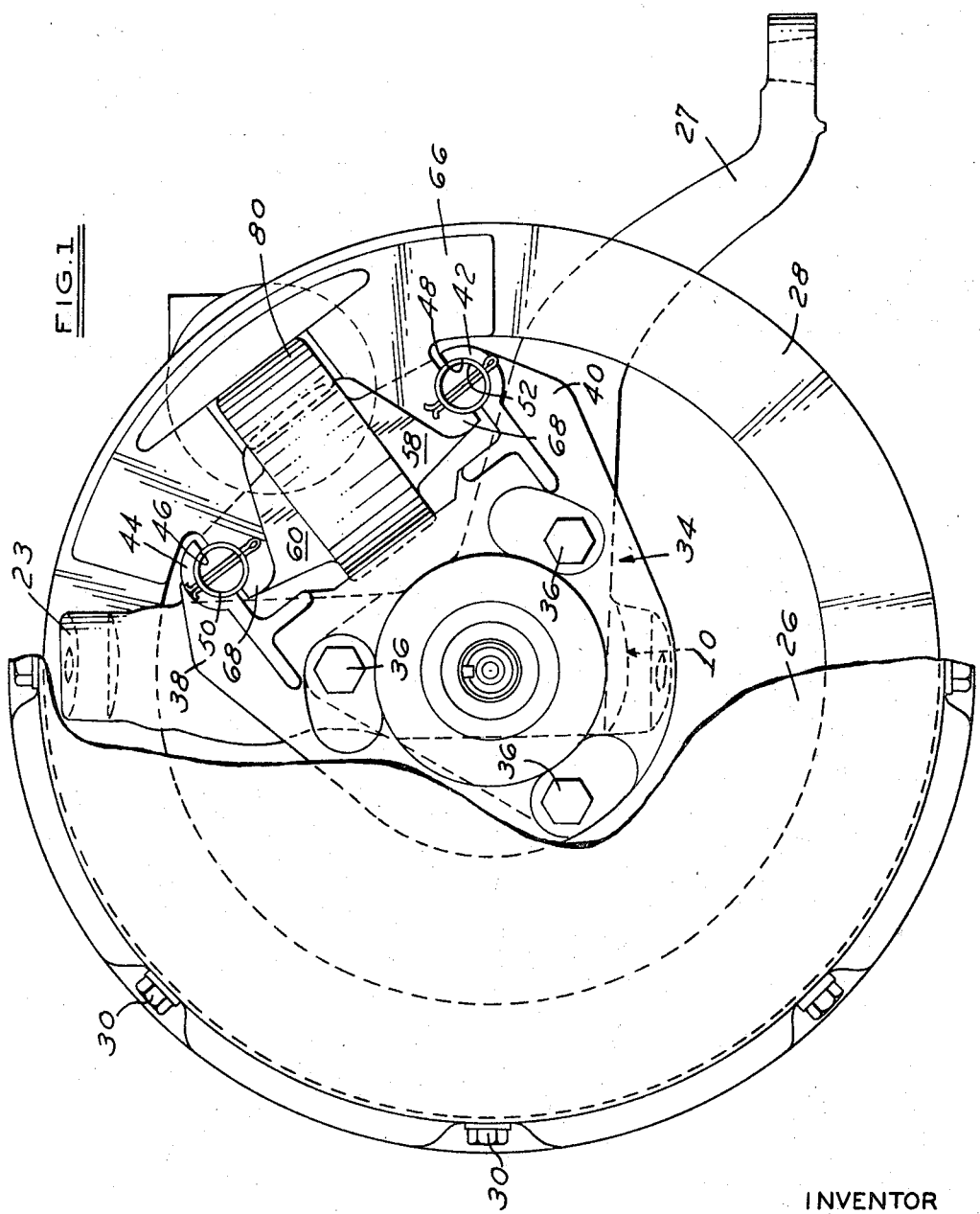
FIGURE 1 is an elevational view of a disc brake constructed in accordance with the presently preferred embodiment of this invention with a portion of the rotor support member broken away.

Referring now to the drawings for a more detailed description of the present invention, FIGURE 1 illustrates a disc brake for a motor vehicle that is constructed in accordance with the presently preferred embodiment of the invention. The caliper brake is constructed for use in connection with a wheel assembly of the type illustrated in FIGURE 6. In that view, a wheel spindle 10 has a spindle portion 12 that rotatably supports a wheel bearing housing 14 by means of roller bearings 16. A wheel 18 has its spider portion 20 attached to the bearing housing 14 by means of bolts 22. The wheel 18 includes a wheel rim 24 of the drop center type which is adapted to receive a pneumatic tire.

A large cup-shape support member 26 is secured to the wheel bearing housing 14 by the bolts 22. An annular brake rotor 28 is secured to the cup-shape member 26 at its outer periphery by bolts 30. The member 26 has inwardly depressed bosses 32 (FIGURE 2) through which the bolts 30 pass. The remainder of the periphery of the cup member 26 is spaced from the periphery of the rotor 28 to provide a series of circumferential gaps through which air may circulate for cooling purposes.

Figure 2:
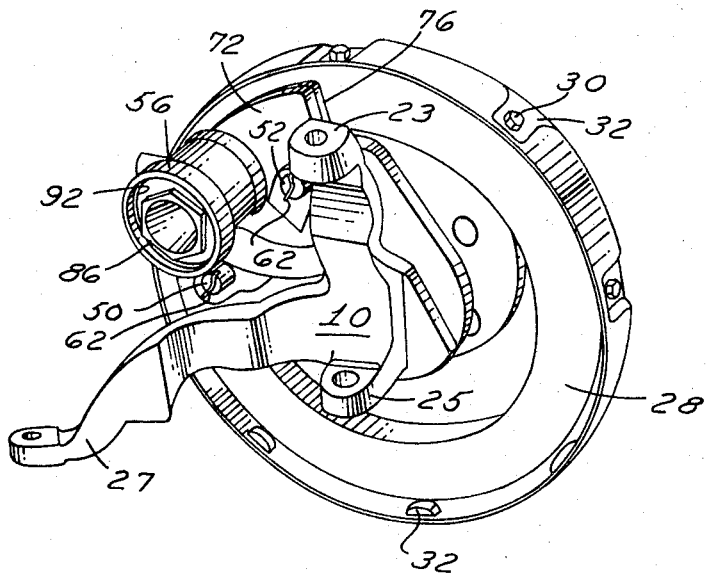
FIGURE 2 is a perspective view of the brake structure of FIGURE 1.
Figure 3:
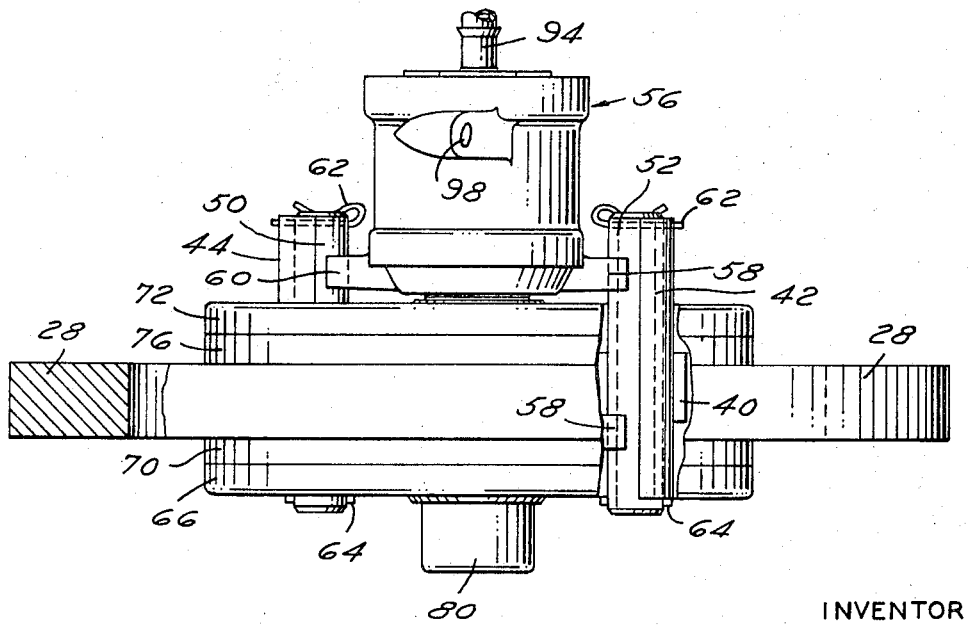
FIGURE 3 is a top plan view of the caliper and rotor structure.

The wheel spindle assembly 10 is used to support the front steerable wheel of a vehicle. As seen in FIGURE 2, the spindle assembly 10 has spaced bosses 23 and 25 to which ball joint assemblies may be secured. The ball joints 23, 25 are used to attach the spindle to suspension arms (not shown). A steering arm 27 extends from the spindle 10 and is attached to the steering linkage of the vehicle.

A torque reaction member 34 is bolted to the wheel spindle 10 by means of spaced bolts 36. The member 34 has a pair of arms 38 and 40 that extend outwardly radially from the axis of the wheel. The arms 38 and 40 carry longitudinally extending portions 42 and 44 having semi-cylindrical recesses 46 and 48. A pair of tubular retaining pins 50 and 52 are seated in the grooves 46 and 48.

A caliper housing 56 is provided with oppositely extending pairs of leg portions 58 and 60. The pair of legs 58 are positioned on either side of arm portion 40 of torque reaction member 34 and have semi-circular recesses that engage the retaining pin 52. The pair of legs 60 of the caliper 56 straddles arm portion 38 of member 34 and have semi-circular recesses that engage the retaining pin 50. The pin 52 is trapped between the legs 58 of the caliper and the portion 42 of the reaction member 34. Similarly, the pin 50 is trapped between the legs 60 of the caliper and the portion 44. The retaining pins 50, 52 thus serve to hold and locate the caliper 56. Sufficient clearances are provided to permit sliding movement of the caliper legs 58 and 60 along the pins 50, 52.

The pins 50, 52 are retained axially in position by removable cotter pins 62 at one end and by rolled pins 64 provided at the other end.

Brake shoe and lining assemblies are also retained by the pins 50, 52. An inside brake shoe 66 has a pair of depending leg portions 68 as seen in FIGURE 1. The legs 68 are notched to engage the pins 50, 52. The body of the brake shoe 66 has a shape corresponding to a segment of the face of the brake rotor 28. A brake lining 70 formed of friction material is bonded to the shoe 66 and has a similar segmental shape.

An outer brake shoe 72 that is interchangeable in shape with the inner shoe 66 has a pair of depending legs 74 that engage the pins 50, 52 by means of notched portions. A segmental brake lining 76 is bonded to the shoe 72. As seen in FIGURE 4, the linings 70 and 76 are positioned adjacent to the opposite radial braking surfaces of the rotor 28.

The two pairs of legs 58 and 60 of the caliper 56 are supported on a portion 78 that extends beneath the rotor 28 and between the legs 68 and 72 of the brake shoes 66 and 74, respectively. As seen in FIGURE 4, the portion 78 has a hook-shape end 80 that abuts the brake shoe 66.

The caliper housing 56 is bored out to provide a cylinder wall 82 into which a piston 84 is slidably fitted. A closure member 86 is seated in the outer end of the cylinder 82 by a flanged portion 88 that abuts against a shoulder 90 of the cylinder wall 82. The closure member 86 is retained by a snap ring 92. A hydraulic fitting 94 constructed to be connected to a brake master cylinder is provided in the closure member 86. The fitting 94 permits the passage of pressure fluid from the brake master cylinder to the pressure chamber 96 situated behind the piston 82.

A plugged opening 98 is provided in the housing of the caliper 96 and is in communication with the pressure chamber 96. The opening 98 permits bleeding of the pressure chamber in order to void the brake system of air.

*Operation*

The brake illustrated in the attached drawing operates in the following fashion. When pressure fluid is transmitted to the pressure chamber 96 by way of the hydraulic fitting 94, the piston 84 will be forced to the right as seen in FIGURE 4 against the brake shoe 72. This, in turn, will force the brake lining 76 against the brake rotor 28. The force of the hydraulic fluid against the closure member 86 will cause the caliper housing 56 to move to the left. This will force the brake shoe 66 in a left-hand direction due to its abutment with the end 80 of the caliper. The brake lining 68, as a consequence, will be pressed against the other side of the rotor 28. Movement of the caliper 56 is permitted by the sliding engagement of the legs 58, 60 with the pins 50, 52.

Thus, hydraulic fluid that is transmitted to the single pressure chamber 96 forces the piston to the right and the caliper to the left (as seen in FIGURE 4) with the result that the brake rotor 28 is clamped between the brake linings 70 and 76. The clamping of the rotor 28 by the linings 70, 76 will retard or stop its rotation. The braking torque will be transmitted from the brake shoes 66, 72 through the pins 50, 52 to the torque reaction member 34.

A brake constructed according to the present invention has many advantages. As seen in FIGURE 6, the brake rotor 28 may have an outside diameter almost as large as that of the wheel. This permits the brake linings 70 and 76 to cover a substantially larger area than is permitted by other designs. One of the principal advantages of the present structure is the manner in which the brake caliper 56 is retained by the pins 50 and 52. By merely removing the cotter keys 62, the retaining pins 50, 52 may be withdrawn. The caliper and both brake shoes are then easily removed for repair or replacement.

The foregoing description presents the presently preferred embodiment of this invention.

I claim:

1. A disc brake for a motor vehicle comprising a brake rotor having a pair of radial braking surfaces, rotor support means constructed to connect said brake rotor to a road wheel, a reaction member having spaced portions, a brake caliper having spaced portions, elongated retaining pins positioned between the caliper portions and the reaction member portions and constructed to retain said caliper against radial movement, said pins being arranged parallel to the axis of rotation of said wheel, retaining means at at least one end of each pin to prevent axial displacement, said caliper portions slidably engaging said pins, a pair of brake lining means positioned adjacent to the braking surfaces of said rotor, said brake lining means each having portions slidably engaging said pins, said caliper having a housing part engaging one of said lining means and a piston part engaging the other of said lining means, said rotor support means comprising an enlarged cup-shaped member connected to the outer periphery of said rotor, whereby said pins may be axially displaced to permit said caliper and said lining means to be removed from said reaction member.

2. A disc brake structure according to claim 1 and including:
said caliper having a longitudinally extending housing portion situated radially inwardly of said rotor and said brake lining means.

3. A disc brake structure according to claim 1 and including:
said rotor having an annular shape, said cup-shape member having spaced attachment points with said rotor and forming spaced openings with said rotor between said points for the flow of cooling air, said caliper having first and second pairs of spaced portions engaging said retaining pins, said portions of said brake lining means being positioned between said first and second pairs of caliper portions, said caliper having a longitudinally extending housing portion situated radially inwardly of said rotor and said brake lining means.

4. A disc brake structure according to claim 1 and including:
said rotor having an annular shape, said cup-shape member being connected to the outer periphery of said rotor at circumferentially spaced points, said member being spaced from said rotor between said points to provide openings for the flow of cooling air, said reaction member portions having longitudinally extending grooves to receive said retaining pins, said caliper having first and second pairs of spaced portions engaging said retaining pins, said portions of said brake lining means being positioned between said first and second pairs of caliper portions, said caliper having a longitudinally extending housing portion situated radially inwardly of said rotor and said brake lining means.

5. A disc brake structure according to claim 1 and including:
said rotor having an annular shape, said cup-shape member being connected to the outer periphery of said rotor at circumferentially spaced points, said cup-shaped member being spaced from said rotor between said points to provide spaced openings for the flow of cooling air about said rotor and said brake lining means.

6. A disc brake for a motor vehicle comprising an annular brake rotor having a pair of radial braking surfaces, said brake rotor being constructed to be connected to a road wheel, a brake torque reaction member having spaced support portions, a brake caliper having spaced attachment portions, elongated retaining members positioned between said attachment portions of said caliper and said support portions of said reaction member, said retaining members being constructed to retain said caliper against radial movement relative to said reaction member, said support portions of said reaction member each having a longitudinally extending groove throughout its length constructed to slidably engage one of said retaining members, said attachment portions of said caliper each having a longitudinally extending groove throughout its length constructed to slidably engage one of said retaining members, a pair of brake lining means positioned adjacent said braking surfaces of said rotor, said brake lining means having grooved attachment portions slidably engaging said retaining members, fastening means holding said retaining member in position and constructed to permit said retaining members to be withdrawn from said grooves whereby said caliper and lining means may be removed from said reaction member.

7. A disc brake structure according to claim 6 and including:

said caliper having a housing part engaging one of said lining means and a piston part engaging the other of said lining means.

8. A disc brake structure according to claim 6 and including:
said caliper having a longitudinally extending housing portion situated radially inwardly of said brake rotor and said brake lining means.

9. A disc brake structure according to claim 6 and including:
said caliper having a housing part engaging one of said lining means and a piston part engaging the other of said lining means, said caliper having a longitudinally extending housing portion situated radially inwardly of said brake rotor and said brake lining means.

10. A disc brake structure according to claim 6 and including:
said retaining members each comprising a cylindrical element slidably engaging said support portions of said reaction member, said grooves being of semi-cylindrical shape.

11. A disc brake structure according to claim 6 and including:
said attachment portions of said brake lining means having a semi-cylindrical shape, and said retaining members each comprising a cylindrical element.

12. A disc brake structure according to claim 6 and including:
said retaining members each comprising a cylindrical element slidably engaging said support portions of said reaction member, said grooves being of semi-cylindrical shape, said caliper having a longitudinally extending housing portion situated radially inwardly of said brake rotor and said brake lining means.

13. A disc brake for a motor vehicle comprising a brake rotor having a pair of radial braking surfaces, rotor support means constructed to connect said brake rotor to a road wheel, a reaction member having spaced support portions, a brake caliper having spaced attachment portions, retaining members positioned between said caliper attachment portions and said reaction member support portions and constructed to retain said caliper against radial movement, said retaining members being arranged with their longitudinal axis parallel to the axis of rotation of said wheel, said caliper attachment portions slidably engaging said retaining members, a pair of brake lining means positioned adjacent to the braking surfaces of said rotor, said brake lining means each having grooved attachment portions slidably engaging said retaining members, said caliper having a housing part engaging one of said lining means and a piston part engaging the other of said lining means, said reaction member support portions each having a longitudinally extending groove throughout its length constructed to receive one of said retaining members, said caliper having first and second pairs of spaced portions each including a longitudinally extending groove throughout its length engaging said retaining members, said portions of said brake lining means being positioned between said first and second pairs of caliper portions, said caliper having a longitudinally extending housing portion situated radially inwardly of said rotor and said brake lining means.

References Cited

UNITED STATES PATENTS

| 2,319,231 | 5/1943 | Hawley | 188—73 |
| 3,194,351 | 7/1965 | Swift | 188—73 |
| 3,213,969 | 10/1965 | Rosanowski et al. | 188—73 |
| 3,255,848 | 6/1966 | Harrison | 188—73 |
| 3,260,332 | 7/1966 | Wells | 188—73 |
| 3,292,740 | 12/1966 | Swift | 188—73 |
| 3,356,193 | 12/1967 | Stowers. | |

FOREIGN PATENTS 785,367  11/1957  Great Britain.

GEORGE E. A. HALVOSA, *Primary Examiner.*